US012681395B2

(12) United States Patent
Iwasaki et al.

(10) Patent No.: US 12,681,395 B2
(45) Date of Patent: Jul. 14, 2026

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Shuhei Iwasaki, Kanagawa (JP); Kunihiko Sekido, Shizuoka (JP); Tatsuya Ohsawa, Shizuoka (JP); Naoyuki Matsumoto, Fukui (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 511 days.

(21) Appl. No.: 18/463,749

(22) Filed: Sep. 8, 2023

(65) Prior Publication Data

US 2024/0111224 A1 Apr. 4, 2024

(30) Foreign Application Priority Data

Sep. 21, 2022 (JP) ................................ 2022-150269

(51) Int. Cl.
*G03G 5/047* (2006.01)
*G03G 5/06* (2006.01)
*G03G 21/18* (2006.01)

(52) U.S. Cl.
CPC ......... *G03G 5/047* (2013.01); *G03G 5/06144* (2020.05); *G03G 5/06145* (2020.05); *G03G 5/0696* (2013.01); *G03G 21/1814* (2013.01)

(58) Field of Classification Search
CPC ........... G03G 5/06144; G03G 5/06142; G03G 5/061443
See application file for complete search history.

(56) References Cited

U.S. PATENT DOCUMENTS 7,141,341 B2 11/2006 Sekido
8,343,699 B2 1/2013 Nagasaka
(Continued)

FOREIGN PATENT DOCUMENTS

JP 2009-25382 * 2/2009 ............... G03G 5/05
JP 2009-186967 A 8/2009
JP 2014-160239 A 9/2014

OTHER PUBLICATIONS

Translation of JP 2009-25382.*
U.S. Appl. No. 18/463,501, filed Sep. 8, 2023, Kunihiko Sekido.
U.S. Appl. No. 18/463,725, filed Sep. 8, 2023, Tatsuya Ohsawa.

*Primary Examiner* — Peter L Vajda
(74) *Attorney, Agent, or Firm* — VENABLE LLP

(57) ABSTRACT

An object of the present disclosure is to provide an electrophotographic photosensitive member which can suppress the potential fluctuation due to repeated use even with the electrophotographic apparatus of high printing process speed. The present disclosure provides an electrophotographic photosensitive member comprising: a support, a charge generating layer, and a charge transporting layer in this order, wherein the charge transporting layer comprises: (α) a compound represented by the formula (C-1), and (β) at least one selected from the group consisting of a compound represented by the following formula (C-2) and a compound represented by the formula (C-3), wherein a content of the (β) in the charge transporting layer with respect to a total mass of the charge transporting layer is 250 to 610 mass ppm.

9 Claims, 1 Drawing Sheet

(56) References Cited

U.S. PATENT DOCUMENTS

| | | | |
|---|---|---|---|
| 8,465,889 | B2 | 6/2013 | Sekido |
| 8,524,430 | B2 | 9/2013 | Takagi |
| 8,546,050 | B2 | 10/2013 | Maruyama |
| 8,632,931 | B2 | 1/2014 | Sekido |
| 8,795,936 | B2 | 8/2014 | Sekido |
| 9,029,054 | B2 | 5/2015 | Okuda |
| 9,063,505 | B2 | 6/2015 | Sekiya |
| 9,069,267 | B2 | 6/2015 | Kaku |
| 9,207,550 | B2 | 12/2015 | Okuda |
| 9,280,072 | B2 | 3/2016 | Ogaki |
| 9,335,645 | B2 | 5/2016 | Tagami |
| 9,442,401 | B2 | 9/2016 | Sekido |
| 9,477,163 | B2 | 10/2016 | Nishi |
| 9,760,030 | B2 | 9/2017 | Sekiya |
| 9,772,568 | B2 | 9/2017 | Sekido |
| 9,811,011 | B2 | 11/2017 | Nishi |
| 9,851,648 | B2 | 12/2017 | Nishi |
| 9,864,285 | B2 | 1/2018 | Nishi |
| 9,921,498 | B2 | 3/2018 | Sekido |
| 10,372,050 | B2 | 8/2019 | Nishi |
| 10,452,021 | B2 | 10/2019 | Miura |
| 10,545,453 | B2 | 1/2020 | Iwasaki |
| 10,663,913 | B2 | 5/2020 | Yamaai |
| 10,831,117 | B2 | 11/2020 | Sakakibara |
| 10,942,462 | B2 | 3/2021 | Ito |
| 11,150,566 | B2 | 10/2021 | Iwasaki |
| 11,392,074 | B2 | 7/2022 | Ishida |
| 11,726,414 | B2 | 8/2023 | Sekido |
| 11,782,353 | B2 | 10/2023 | Nakamura |
| 2014/0212800 | A1 | 7/2014 | Miura |
| 2021/0318629 | A1 | 10/2021 | Nishi |
| 2021/0325794 | A1 | 10/2021 | Iwasaki |
| 2023/0058278 | A1 | 2/2023 | Maruyama |
| 2023/0059041 | A1 | 2/2023 | Kaku |
| 2023/0059773 | A1 | 2/2023 | Yamaai |
| 2023/0090596 | A1 | 3/2023 | Sekido |
| 2023/0093328 | A1 | 3/2023 | Nishi |
| 2023/0115474 | A1 | 4/2023 | Watanabe |
| 2023/0288836 | A1 | 9/2023 | Iwasaki |
| 2023/0350314 | A1 | 11/2023 | Sekido |

* cited by examiner

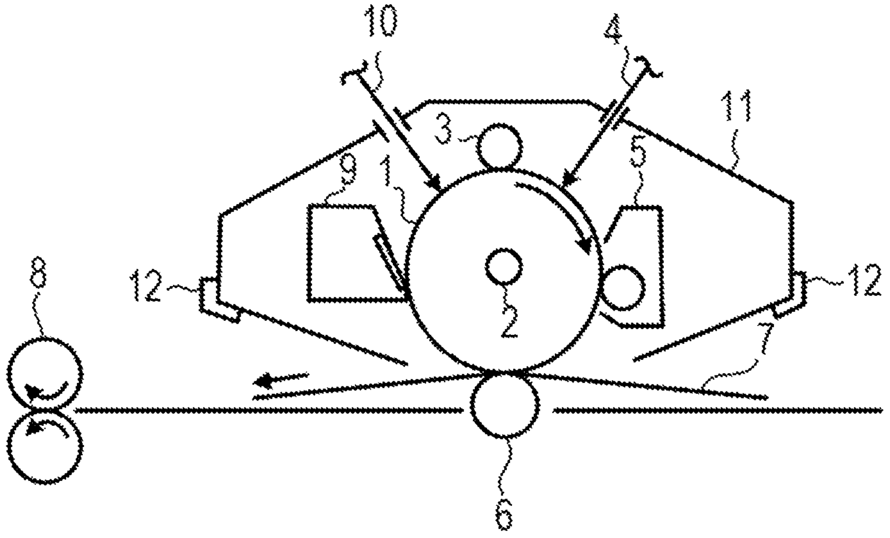
10
4
11
3
9
1
5
8
12
12
2
7
6

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present disclosure relates to an electrophotographic photosensitive member, and a process cartridge and an electrophotographic apparatus each including the electrophotographic photosensitive member.

Description of the Related Art

In general, an electrophotographic photosensitive member (hereinafter also simply referred to as "a photosensitive member") to be used in an electrophotographic apparatus has hitherto been formed of various layers, such as a photosensitive layer, on a support. In addition, as an electrophotographic photosensitive member, from the standpoint of low cost and high productivity, organic photosensitive members, in which the main component of the layer formed on the support is resin, have become popular in recent years. Among them, organic photosensitive members in which the photosensitive layer is a laminate type photosensitive layer, are the mainstream due to the advantages of high sensitivity and diversity in material design.

A laminate type organic photosensitive layer is formed of laminate of a charge generating layer containing a charge generating substance such as a photo electroconductive dye or a photo electroconductive pigment and a charge transporting layer containing a charge transporting substance such as a photo electroconductive high molecule or a photo electroconductive low molecule.

In recent years, as the printing process speed of an electrophotographic apparatus has increased, it is desirable to provide a photosensitive member with a higher degree of suppression of a potential fluctuation even when repeatedly used under such a high speed process.

Japanese Patent Application Laid-Open No. 2009-186967 describes a technique to improve image stability in repeated use by using a combination of an enamine-based charge transporting substance with a specific structure and a binder resin in a certain ratio.

Japanese Patent Application Laid-Open No. 2014-160239 describes a technology to improve charge-transportability in a charge transporting layer containing a binder resin with a specific chemical structure and a charge transporting substance by gradually increasing the ratio of the presence of the charge transporting substance to the binder resin along the depth direction from the outer surface to the support side of the electrophotographic photosensitive member, thereby increasing the ratio of the presence of the charge transporting substance near the interface between the charge transporting layer and the charge generating layer relatively.

SUMMARY OF THE INVENTION

However, the inventors have made investigations, and as a result, have found that the electrophotographic photosensitive member described in Japanese Patent Application Laid-Open No. 2009-186967 or Japanese Patent Application Laid-Open No. 2014-160239 cannot sufficiently suppress the potential fluctuation due to repeated use when the printing process speed of the electrophotographic apparatus is higher than the conventional one.

The inventors have assumed the reason for the above is that at the interface between the charge transporting layer and the charge generating layer, charges generated by exposure are more likely to be trapped, and the trapped charges are more likely to accumulate when repeatedly used, especially in an electrophotographic apparatus with high printing process speed.

Therefore, an object of the present disclosure is to provide an electrophotographic photosensitive member which can suppress the potential fluctuation due to repeated use even with the electrophotographic apparatus of high printing process speed.

Another aspect of the present disclosure is to provide a process cartridge and an electrophotographic apparatus each equipped with the above electrophotographic photosensitive member.

The above-mentioned object is achieved by the present disclosure described below.

That is, the electrophotographic photosensitive member according to the present invention is an electrophotographic photosensitive member comprising:

a support, a charge generating layer, and a charge transporting layer in this order, wherein the charge transporting layer comprises:

(α) a compound represented by a following formula (C-1), and (β) at least one selected from the group consisting of a compound represented by a following formula (C-2) and a compound represented by a following formula (C-3), wherein a content of the (β) in the charge transporting layer with respect to a total mass of the charge transporting layer is 250 to 610 mass ppm.

(C-1)

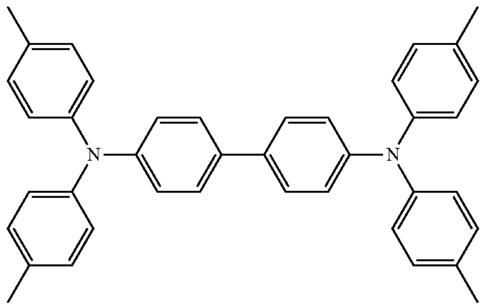

(C-2)

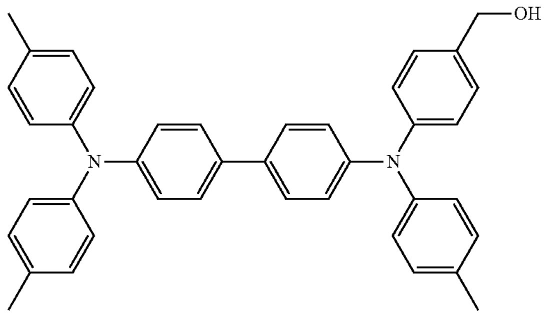

-continued (C-3)

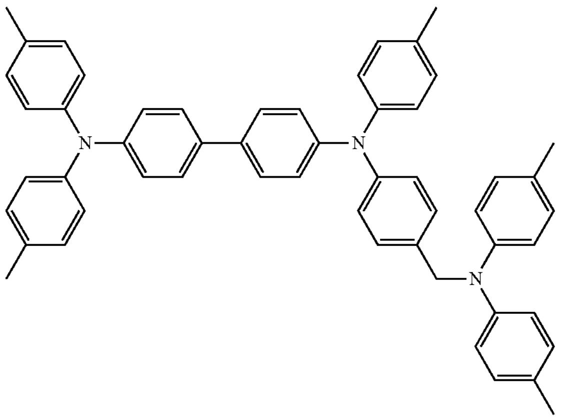

In addition, in another aspect of the present disclosure, a process cartridge comprising: the above electrophotographic photosensitive member; and at least one unit selected from the group consisting of a charging unit, a developing unit, and a cleaning unit, the process cartridge integrally supporting the electrophotographic photosensitive member and the at least one unit, and being detachably attachable to a main body of an electrophotographic apparatus is provided.

In addition, in another aspect of the present disclosure, an electrophotographic apparatus comprising: the above electrophotographic photosensitive member, an exposing unit, a charging unit, a developing unit, and a transfer unit is provided.

Further features of the present invention will become apparent from the following description of exemplary embodiments with reference to the attached drawing.

BRIEF DESCRIPTION OF THE DRAWINGS

FIG. 1*s* a view for illustrating an example of the schematic configuration of an electrophotographic apparatus having a process cartridge with an electrophotographic photosensitive member of the present disclosure.

DESCRIPTION OF THE EMBODIMENTS

Hereafter, the present disclosure will be described in detail with reference to an exemplary embodiment.

The inventors have made investigations and found that the photosensitive member of the prior art cannot sufficiently suppress the potential fluctuation due to repeated use when the printing process speed of the electrophotographic apparatus is made higher than the conventional.

The inventors have assumed the reason for the above is that at the interface between the charge transporting layer and the charge generating layer, charges generated by exposure are more likely to be trapped, and the trapped charges are more likely to accumulate when the photosensitive member is repeatedly used, especially in electrophotographic apparatuses at high printing process speed.

In particular, a photosensitive member containing a compound represented by the following formula (C-1) as a charge transporting compound has a good initial sensitivity, but in order to cope with the recent increase in the printing process speed of electrophotographic apparatuses, it is desirable to suppress potential fluctuation to a higher degree.

(C-1)

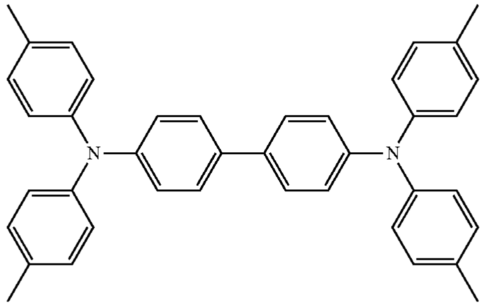

The inventors have repeated investigations to solve the above problem that has arisen in the prior art and found that the combination of certain materials can suppress the potential fluctuation due to repeated use with the electrophotographic apparatus of high printing process speed.

Therefore, the electrophotographic photosensitive member of the present disclosure is characterized by comprising:

a support, a charge generating layer, and a charge transporting layer in this order, wherein the charge transporting layer comprises:

(α) a compound represented by a following formula (C-1), and (β) at least one selected from the group consisting of a compound represented by a following formula (C-2) and a compound represented by a following formula (C-3), wherein a content of the (β) in the charge transporting layer with respect to a total mass of the charge transporting layer is 250 to 610 mass ppm.

(C-1)

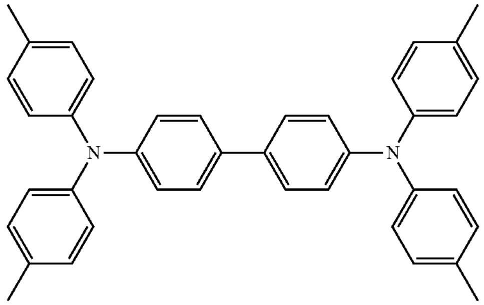

(C-2)

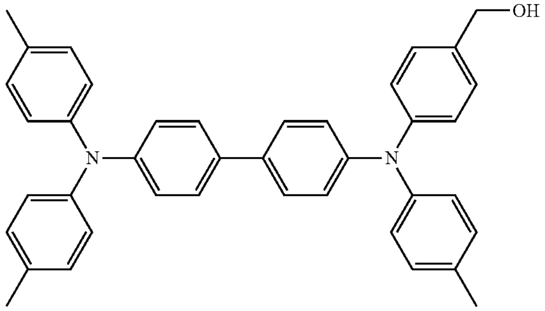

-continued (C-3)

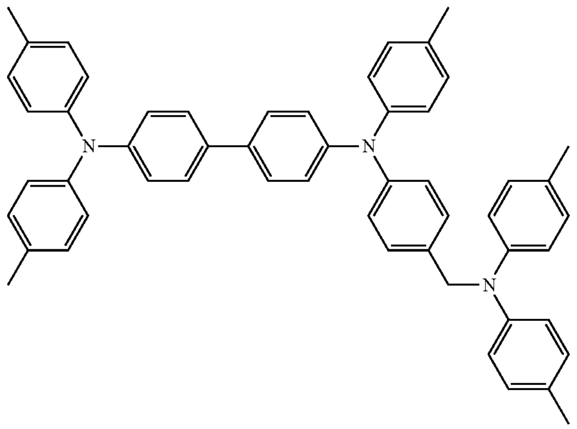

Here, the content of the (β) is the sum of the amount of a compound represented by the formula (C-2) and the amount of a compound represented by the formula (C-3).

Further, the present disclosure relates to a process cartridge comprising: the above electrophotographic photosensitive member; and at least one unit selected from the group consisting of a charging unit, a developing unit, and a cleaning unit, the process cartridge integrally supporting the above electrophotographic photosensitive member and the at least one unit, and being detachably attachable to a main body of an electrophotographic apparatus.

Further the present disclosure relates to an electrophotographic apparatus comprising: the above electrophotographic photosensitive member, an exposing unit, a charging unit, a developing unit, and a transfer unit.

The inventors consider the mechanism by which such a configuration can solve the above technical problems as follows.

The compound represented by the formula (C-1) has a small dipole moment derived from its molecular structure. Therefore, when the compound is used as a charge transporting substance, the effect of pulling out holes generated in the charge generating layer into the charge transporting layer is less, and charges generated by exposure at the interface are more likely to be trapped. That is thought to be the reason why the compound (C-1) alone was not enough to keep up with the speed-up of the imaging process.

In contrast, a compound represented by the formula (C-2) or a compound represented by the formula (C-3) has a larger dipole moment than a compound represented by the formula (C-1). Therefore, it was assumed that by making the charge transporting layer contain at least one of a compound represented by the formula (C-2) and the compound represented by the formula (C-3) in addition to the compound represented by the formula (C-1), the hole pull-out effect at the interface between the charge generating layer and the charge transporting layer was enhanced. It was thought that, as a result, the accumulation of trapped charge was suppressed, and the potential fluctuation due to repeated use was suppressed even in the electrophotographic apparatus with a high printing process speed.

On the other hand, the inventors investigated and found that when the charge transporting layer contained a compound having a molecular structure with a larger dipole moment but is different from that of the compound represented by the formula (C-2) or the compound represented by the formula (C-3) in addition to the compound represented by the formula (C-1), the potential fluctuation due to repeated use was not suppressed sufficiently.

The reason why the potential fluctuation due to repeated use was suppressed sufficiently only when at least one of the compound represented by the formula (C-2) and the compound represented by the formula (C-3) was combined with the compound represented by the formula (C-1) is considered to be that the compound represented by the formula (C-2) or the compound represented by the formula (C-3) has a large dipole moment and, in addition, the basic skeleton of the molecule of each of the compounds represented by the formula (C-2) and the formula (C-3) is similar to that of the compound represented by the formula (C-1), which results in smooth hole transport between the 2 molecules, the compound represented by the formula (C-1) and the compounds represented by the formula (C-2) or the formula (C-3).

In contrast, it is considered that when a compound of which skeleton is different from that of the compound represented by the formula (C-1) used as the charge transporting substance is contained in the charge transporting layer, hole transport in a charge transporting layer is inhibited and the trapped charges are accumulated.

Therefore, both hole pull-out at charge generating layer-charge transporting layer interface and hole transportation in charge transporting layer can be achieved with high efficiency thus the effect of the present disclosure can be achieved only when combining the compound represented by the formula (C-1) (charge transporting compound (C-1)) and at least one of the compound represented by the formula (C-2) and the compound represented by the formula (C-3).

In addition, the inventors investigated and found that it is necessary for the sum X represented by the following the formula (1) to be 250 to 610 ppm to suppress the potential fluctuation by repeated use sufficiently, when A (ppm) is the content of the compound represented by the formula (C-2) with respect to a total mass of the charge transporting layer and B(ppm) is the content of the compound represented by the formula (C-3) with respect to a total mass of the charge transporting layer.

$$X=A+B \quad (1)$$

When the sum X is 250 ppm or more, the effect of hole pull-out at charge generating layer-charge transporting layer interface can be achieved sufficiently. When the X, the sum, is 610 ppm or less, the compounds represented by the formula (C-2) or the compounds represented by the formula (C-3) do not aggregate each other in the charge transporting layer and the hole transportation in charge transporting layer can be achieved.

[Electrophotographic Photosensitive Member]

An electrophotographic photosensitive member of the present disclosure includes a support, a charge generating layer, and a charge transporting layer.

As a method of producing the electrophotographic photosensitive member of the present disclosure, there is given a method involving preparing coating liquids for respective layers to be described later, applying the coating liquids for the respective layers in a desired order, and drying the coating liquids. In this case, as a method of applying the coating liquids, there are given, for example, dip coating, spray coating, inkjet coating, roll coating, die coating, blade coating, curtain coating, wire bar coating, and ring coating. Of those, dip coating is preferred from the viewpoints of efficiency and productivity.

The respective layers are described below.

<Support>

In the present disclosure, the electrophotographic photosensitive member includes a support. In the present disclosure, the support is preferably an electroconductive support having electroconductivity. In addition, examples of the shape of the support include a cylindrical shape, a belt shape, and a sheet shape. Of those, a cylindrical support is preferred. In addition, the surface of the support may be subjected to, for example, electrochemical treatment such as anodization, blast treatment, or cutting treatment.

A metal, a resin, glass, or the like is preferred as a material for the support.

Examples of the metal include aluminum, iron, nickel, copper, gold, stainless steel, and alloys thereof. Of those, aluminum is preferred, and the support is preferably an aluminum support.

In addition, electroconductivity may be imparted to the resin or the glass through treatment involving, for example, mixing or coating the resin or the glass with an electroconductive material.

<Electroconductive Layer>

In the present disclosure, an electroconductive layer may be arranged on the support. The arrangement of the electroconductive layer can conceal flaws and unevenness in the surface of the support, and control the reflection of light on the surface of the support.

The electroconductive layer preferably contains electroconductive particles and a resin.

A material for the electroconductive particles is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, the metal oxide is preferably used as the electroconductive particles, and in particular, titanium oxide, tin oxide, and zinc oxide are more preferably used.

When the metal oxide is used as the electroconductive particles, the surface of the metal oxide may be treated with a silane coupling agent or the like, or the metal oxide may be doped with an element, such as phosphorus or aluminum, or an oxide thereof.

In addition, the electroconductive particles may each be of a laminated configuration having a core particle and a coating layer coating the particle. Examples of the core particle include titanium oxide, barium sulfate, and zinc oxide. The coating layer is, for example, a metal oxide such as tin oxide.

In addition, when the metal oxide is used as the electroconductive particles, their volume-average particle diameter is preferably 1 to 500 nm, more preferably 3 to 400 nm or less.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain, for example, a silicone oil, resin particles, or a concealing agent such as titanium oxide.

The average thickness of the electroconductive layer is preferably 1 to 50 μm, particularly preferably 3 to 40 μm.

The electroconductive layer may be formed by preparing a coating liquid for an electroconductive layer containing the above-mentioned materials and a solvent, forming a coating film thereof, and drying the coating film. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. A dispersion method for dispersing the electroconductive particles in the coating liquid for an electroconductive layer is, for example, a method involving using a paint shaker, a sand mill, a ball mill, or a liquid collision type high-speed disperser.

<Undercoat Layer>

In the present disclosure, an undercoat layer may be arranged on the support or the electroconductive layer. The arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxy group, an amino group, a carboxy group, a thiol group, a carboxylic acid anhydride group, and a carbon-carbon double bond group.

In addition, the undercoat layer may further contain an electron-transporting substance, a metal oxide, a metal, an electroconductive polymer, and the like for the purpose of improving electric characteristics. Of those, an electron-transporting substance and a metal oxide are preferably used.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting substance having a polymerizable functional group may be used as the electron-transporting substance and copolymerized with the above-mentioned monomer having a polymerizable functional group to form the undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

When the metal oxide is used, the surface of the metal oxide may be treated with a silane coupling agent or the like, or the metal oxide may be doped with an element, such as phosphorus or aluminum, or an oxide thereof.

In addition, the undercoat layer may further contain an additive.

The undercoat layer has an average thickness of preferably from 0.1 to 50 μm, more preferably from 0.2 to 40 μm, particularly preferably from 0.3 to 30 μm.

The undercoat layer may be formed by preparing a coating liquid for an undercoat layer containing the above-mentioned materials and a solvent, forming a coating film thereof, and drying and/or curing the coating film. Examples of the solvent to be used for the coating liquid include an alcohol-based solvent, a ketone-based solvent, an ether-based solvent, an ester-based solvent, and an aromatic hydrocarbon-based solvent.

<Charge Generating Layer>

The electrophotographic photosensitive member of one aspect of the present disclosure has a charge generating layer on the support.

The charge generating layer preferably includes a charge generating substance and a binder resin.

Examples of the charge generating substance include azo pigments, perylene pigments, polycyclic quinone pigments, indigo pigments, and phthalocyanine pigments. Of those, azo pigments and phthalocyanine pigments are preferred. Of the phthalocyanine pigments, titanyl phthalocyanine pigments, a chlorogallium phthalocyanine pigment, a hydroxygallium phthalocyanine pigment are preferable. In particular, titanyl phthalocyanine pigments (pigments containing oxy titamium phthalocyanine crystal) are more preferable, in such cases, the effect of hole transferability at charge generating layer-charge transporting layer interface is high.

When titanyl phthalocyanine pigments are used as the charge generating substance, among titanyl phthalocyanine pigments, an oxy titamium phthalocyanine crystal having a crystal particle of which crystal type shows peaks at Bragg angles 2θ of 9.8°±0.30 and 27.1°±0.3° in an X-ray diffraction spectrum using CuKα radiation.

Measurement of powder X-ray diffraction of the phthalocyanine pigment contained in the electrophotographic photosensitive member of the present disclosure was performed under the following conditions.

[Powder X-Ray Diffraction Measurement]

Measuring machine for the use: X-ray diffractometer RINT-TTRII, manufactured by
Rigaku Corporation
X-ray tube bulb: Cu
X-ray wavelength: Kα1
Tube voltage: 50 KV
Tube current: 300 mA
Scanning method: 2θscan
Scanning rate: 4.0°/min
Sampling interval: 0.020
Start angle 2θ: 5.0°
Stop angle 2θ: 35.0°
Goniometer: Rotor Horizontal Goniometer (TTR-2)
Attachment: Capillary Rotating Sample Stand
Filter: None
Detector: Scintillation counter
Incident monochrome: used
Slit: variable slit (parallel beam method)
Counter monochromator: not used
Divergent slit: open
Divergent longitudinal limiting slit: 10.00 mm
Scattering slit: open
Light receiving slit: open The content of charge generating substance in the charge generating layer is preferably 40 to 85 mass %, and more preferably 60 to 80 mass % with respect to the total mass of the charge generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, a polyvinyl chloride resin, or the like. Among them, a polyvinyl butyral resin is more preferable.

In addition, the charge generating layer may further contain an additive such as an antioxidant or an ultraviolet absorber. Specific examples thereof can include a hindered phenol compound, a hindered amine compound, a sulfur compound, a phosphorus compound, and a benzophenone compound.

An average thickness of the charge generating layer is preferably 0.1 to 1 μm, and more preferably 0.15 to 0.4 μm.

The charge generating layer can be formed by preparing a coating liquid for a charge generating layer containing the above-described respective materials and a solvent, forming a coating film thereof, and drying the coating film. Examples of the solvent used in the coating liquid can include an alcohol-based solvent, a sulfoxide-based solvent, a ketone-based solvent, an ether-based solvent, an ester-based solvent, and an aromatic hydrocarbon-based solvent.

<Charge Transporting Layer>

The electrophotographic photosensitive member of one aspect of the present disclosure has a charge transporting layer on the charge generating layer. The charge transporting layer preferably contains a charge transporting substance (a charge transporting compound) and a binder resin.

As mentioned in the above, the charge transporting layer of the present disclosure contains the compound represented by the formula (C-1) as a charge transporting substance.

The charge transporting layer of the present disclosure further can contain charge transporting substances other than the compound represented by the formula (C-1).

Examples of the charge transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content C (%) of the compound represented by the formula (C-1) to the total mass of the charge transporting substance is preferably 30 mass % or more from the standpoint of achievement of both high exposure sensitivity and suppression effect of potential fluctuation by repeated use, and more preferably 50% or more.

On the other hand, the content C (%) is preferably 90% or less from the standpoint of achievement of both the membranous nature of the charge transporting layer and suppression effect of potential fluctuation, and more preferably 70% or less.

When C (%), which is the content of the compound represented by the formula (C-1) with respect to the total mass of the charge transporting substance is 30 mass % or more, the content of the compound represented by the formula (C-1) in the charge transporting layer is 30 mass % or more with respect to the total content of (α) and (β). In this case, both high exposure sensitivity and the suppression effect of potential fluctuation due to repeated use can be achieved.

Examples of the binder resin include a polyester resin, a polycarbonate resin, an acrylic resin and a polystyrene resin. Among them, a polycarbonate resin and a polyester resin are preferable.

When Y (%) is the content of the compound represented by the formula (C-1) with respect to the content of the binder resin, the content Y (%) is preferably 20 to 200 mass % from the standpoint of achievement of both high exposure sensitivity and suppression effect of potential fluctuation by repeated use, and more preferably 40 to 100 mass %.

The electrophotographic photosensitive member of one aspect of the present disclosure contains at least one of the compound represented by the formula (C-2) and the compound represented by the formula (C-3), and it is necessary for the X represented by the formula (1) to be 250 to 610 mass ppm and it is more preferable for the X to be 350 to 500 mass ppm, when A (ppm) is the content of the compound represented by the formula (C-2) with respect to a total mass of the charge transporting layer and B (ppm) is the content of the compound represented by the formula (C-3) with respect to a total mass of the charge transporting layer. If the sum X is in the above range, the potential fluctuation by repeated use can be suppressed.

$$X=A+B \quad (1)$$

The photosensitive member of the present disclosure more preferably contains the compound represented by the formula (C-3) from the standpoint of achievement of both high exposure sensitivity and suppression effect of potential fluctuation by repeated use. The B, the content of the compound represented by the formula (C-3) with respect to the total mass of the charge transporting layer, is preferably 120 to 610 ppm and more preferably 250 to 500 ppm.

When D (ppm) is the content of the compound represented by the formula (C-2) with respect to the content of the charge transporting compound represented by the formula (C-1) and E (ppm) is the content of the compound represented by the formula (C-3) with respect to the content of the charge transporting compound represented by the formula (C-1), the sum Z represented by the following formula (2) is preferably 500 ppm or more from the standpoint to obtain the more effective suppression effect of potential fluctuation and the Z is more preferably 800 ppm or more.

$$Z=D+E \quad (2)$$

In addition, the charge transport layer may also contain an additive such as an antioxidant, an ultraviolet absorber, a plasticizer, a leveling agent, a lubricity imparting agent, or an abrasion resistance improver. Specific examples thereof can include a hindered phenol compound, a hindered amine compound, a sulfur compound, a phosphorus compound, a benzophenone compound, a siloxane-modified resin, silicone oil, a fluorine resin particle, a polystyrene resin particle, a polyethylene resin particle, a silica particle, an alumina particle, and a boron nitride particle.

The average thickness of the charge transporting layer is preferably 5 to 50 μm, more preferably 8 to 40 μm, and particularly preferably 10 to 30 μm.

The charge transporting layer may be formed by preparing a coating liquid for a charge transporting layer containing the above-mentioned respective materials and a solvent, forming a coating film thereof, and drying the coating film. Examples of the solvent to be used for the coating liquid include an alcohol-based solvent, a ketone-based solvent, an ether-based solvent, an ester-based solvent, and an aromatic hydrocarbon-based solvent. Of those, an ether-based solvent or an aromatic hydrocarbon-based solvent is preferable.

In the present disclosure, methods for measuring the contents of charge transporting substance, binder resin, compound represented by the formula (C-2) or compound represented by the formula (C-3) in the charge transporting layer are not particularly limited, while qualitative and quantitative determination can be used by a combination of Fourier transform infrared spectroscopy (FT-IR), matrix-assisted laser desorption/ionization mass spectrometry (MALDI-MS), nuclear magnetic resonance spectroscopy (NMR), liquid chromatography-mass spectrometry (LC/MS) and the like.

<Protection Layer>

In the present disclosure, a protection layer may be arranged on the charge transporting layer. The arrangement of the protection layer can improve durability.

It is preferred that the protection layer contains electroconductive particles and/or a charge transporting substance, and a resin.

Examples of the electroconductive particles include particles of metal oxides, such as titanium oxide, zinc oxide, tin oxide, and indium oxide.

Examples of the charge transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred.

In addition, the protection layer may be formed as a cured film by polymerizing a composition containing a monomer having a polymerizable functional group. A reaction at that time is, for example, a thermal polymerization reaction, a photopolymerization reaction, or a radiation polymerization reaction. Examples of the polymerizable functional group of the monomer having a polymerizable functional group include an acryloyl group and a methacryloyl group. A material having a charge transporting ability may be used as the monomer having a polymerizable functional group.

The protection layer may contain an additive, such as an antioxidant, a UV absorber, a plasticizer, a leveling agent, a lubricity imparting agent, or an abrasion resistance improver. Specific examples thereof include a hindered phenol compound, a hindered amine compound, a sulfur compound, a phosphorus compound, a benzophenone compound, a siloxane-modified resin, a silicone oil, a fluorine resin particle, polystyrene resin particles, polyethylene resin particles, silica particles, alumina particles, and boron nitride particles.

The average thickness of the protection layer is preferably 0.5 to 10 μm, more preferably 1 to 7 μm or less.

The protection layer may be formed by preparing a coating liquid for a protection layer containing the above-mentioned respective materials and a solvent, forming a coating film thereof, and drying and/or curing the coating film. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

[Process Cartridge and Electrophotographic Apparatus]

A process cartridge of one aspect of the present disclosure has a feature of integrally supporting the electrophotographic photosensitive member described in the foregoing, and at least one unit selected from the group consisting of: a charging unit; a developing unit; and a cleaning unit, and being detachably attachable to the main body of an electrophotographic apparatus.

In addition, an electrophotographic apparatus of one aspect of the present disclosure has a feature of including: the electrophotographic photosensitive member described in the foregoing; an exposing unit; a charging unit; a developing unit; and a transfer unit.

An example of the schematic configuration of an electrophotographic apparatus including the process cartridge including the electrophotographic photosensitive member is illustrated in FIGURE.

An electrophotographic photosensitive member 1 of a cylindrical shape is rotationally driven about a shaft 2 in a direction indicated by the arrow at a predetermined peripheral speed. The surface of the electrophotographic photosensitive member 1 is charged to a positive or negative predetermined potential by a charging unit 3. Although a roller charging system based on a roller type charging member is illustrated in the figure, a charging system, such as a corona charging system, a contact charging system, or an injection charging system, may be adopted. The charged surface of the electrophotographic photosensitive member 1 is irradiated with exposure light 4 from an exposing unit (not shown), and thus an electrostatic latent image corresponding to target image information is formed thereon. The electrostatic latent image formed on the surface of the electrophotographic photosensitive member 1 is developed with a toner stored in a developing unit 5, and a toner image is formed on the surface of the electrophotographic photosensitive member 1. The toner image formed on the surface of the electrophotographic photosensitive member 1 is transferred onto a transfer material 7 by a transfer unit 6. The transfer material 7 onto which the toner image has been transferred is conveyed to a fixing unit 8, is subjected to treatment for fixing the toner image, and is printed out to the outside of the electrophotographic apparatus. The electrophotographic apparatus may include a cleaning unit 9 for removing a deposit such as the toner remaining on the surface of the electrophotographic photosensitive member 1 after the transfer. The cleaning unit 9 is preferably a cleaning blade having a urethane resin. In addition, a so-called cleaner-less system configured to remove the deposit with the developing unit or the like without separate arrangement of the cleaning unit 9 may be used. The electrophotographic apparatus may include an electricity-removing mechanism configured to subject the surface of the electrophotographic photosensitive member 1 to electricity-removing treatment with pre-exposure light 10 from a pre-exposing unit (not shown). In addition, a guiding unit 12 such as a rail may be arranged for detachably attachable a process cartridge 11 of one aspect of the present disclosure onto the main body of the electrophotographic apparatus.

The electrophotographic photosensitive member of one aspect of the present disclosure may be used in an electrophotographic image forming apparatus, for example, a laser beam printer, an LED printer, a copying machine, a facsimile, and a multifunction machine thereof.

By the present disclosure, the electrophotographic photosensitive member which sufficiently suppress the potential fluctuation due to repeated use even with the electrophotographic apparatus of high printing process speed can be provided.

EXAMPLES

The present disclosure is described in more detail below by way of Examples and Comparative Examples. The present disclosure is by no means limited to the following Examples as long as its modifications do not deviate from the gist of the present disclosure. In the following description of Examples, the terms “part(s)” “%” and “ppm” are on mass basis unless otherwise stated.

Synthesis Example of Compound

The confirmation of the compounds and the like to be used for the present disclosure was conducted by the following mass analysis method.

A matrix-assisted laser desorption ionization time-of-flight mass spectrometer (MALDI-TOF MS: Ultraflex, manufactured by Bulker Daltonics, Inc.) was used. The measurement was conducted by the following conditions and the molecular weight of the object was confirmed based on the obtained peak top value. Acceleration voltage: 20 kV, mode: Reflector, molecular weight standard: fullerene C60.

Synthesis Example 1

Synthesis of Compound (C-2)

Under a flow of nitrogen at 25° C., 10 parts of a compound represented by formula (111), 1 part of ion exchange water, and 1 part of sodium hydroxide were added to a 300 ml three-neck flask containing 150 parts of tetrahydrofuran. The temperature was raised to a reflux condition and the mixture was stirred for 8 hours.

(111)

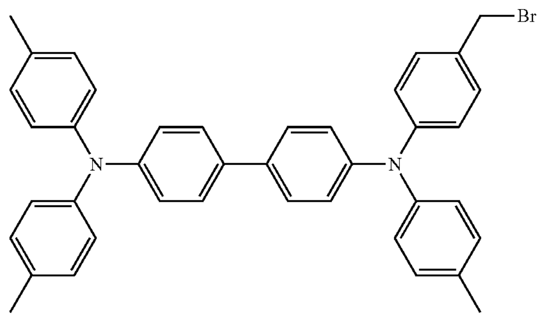

After the reaction, the reaction solution was concentrated under reduced pressure, toluene was added to the residue, followed by filtration, and the filtrate was concentrated in an evaporator and purified by silica gel column chromatography (development solvent: n-heptane/toluene). Further, the collected product was recrystallized in a toluene/hexane mixture solution to give 2.4 parts of the compound represented by the formula (C-2).

The obtained compound was measured by MALDI-TOF MS and the peak top value was 560.

Synthesis Example 2

Synthesis of Compound (C-3)

Under a flow of nitrogen at 25° C., 10 parts of a compound represented by the formula (111), 1 part of lithium bis (trimethylsilyl) amide (26% tetrahydrofuran solution) (manufactured by Tokyo Chemical Industry Co., Ltd.) and 5 parts of p, p'-ditolylamine (manufactured by Tokyo Chemical Industry Co., Ltd.) were added to a 300 ml three-neck flask containing 150 parts of tetrahydrofuran and stirred for 8 hours.

After the reaction, the reaction solution was concentrated under reduced pressure, toluene was added to the residue, followed by filtration, and the filtrate was concentrated in an evaporator and purified by silica gel column chromatography (development solvent: n-heptane/toluene). Further, the collected product was recrystallized in a toluene/hexane mixture solution to give 1.2 parts of the compound represented by the formula (C-3).

The obtained compound was measured by MALDI-TOF MS and the peak top value was 739.

Example 1

<Support>

An aluminum cylinder (JIS-A3003, aluminum alloy) 24 mm in diameter and 257 mm in length was designated as a support (electroconductive support).

<Undercoat Layer>

A dispersion was prepared by adding 3 parts of rutile type titanium oxide particles (average primary particle size: 150 nm, manufactured by Tayca corporation), 4.5 parts of N-methoxymethylated nylon (trade name: Tresin (trademark) EF-30 T, manufactured by Nagase ChemteX Corporation) and 1.5 parts of copolymerized nylon resin (trade name: Amiran (trademark) CM8000, manufactured by Toray Industries, Inc.) to a mixed solvent of 90 parts of methanol and 60 parts of 1-butanol. The dispersion was subjected to dispersion treatment using 1.0 mm diameter glass beads in a vertical sand mill for 6 hours. The dispersion was further subjected to a dispersion treatment by an ultrasonic disperser (UT-205, manufactured by Sharp Corporation) for 1 hour to obtain the coating liquid for the undercoat layer. The output of the ultrasonic disperser was set at 100%. No media such as glass beads were used in this milling process.

Then, the obtained coating liquid for the undercoat layer was dip-coated on the above support to form a coating film, and the coating film was heated and dried at a temperature of 100° C. for 10 minutes to form an undercoat layer with a thickness of 2 μm.

<Charge Generating Layer>

A mixture of 15 parts of titanyl phthalocyanine pigment (CG-01H manufactured by IT Chemical Co., LTD.) with the crystal type showing peaks at Bragg angles 2θ of 9.8°±0.3° and 27.1°+0.3° in an X-ray diffraction spectrum using CuKα radiation, 10 parts polyvinyl butyral (trade name: S-LEC (trademark) BX-1, manufactured by Sekisui Chemical Co., LTD.), 139 parts cyclohexanone, and 354 parts of glass beads of 0.9 mm diameter were dispersed in a sand mill (K-800, manufactured by Igarashi Machine Production Co. Ltd (Aimex Co., LTD. now), 70 mm disk diameter, 5 disks) with cooling water temperature of 18° C. for 4 hours. The dispersion was performed under the condition that the disk rotated 1,800 times per minute. Coating liquid A for the charge generating layer was prepared by adding 326 parts of cyclohexanone and 465 parts of ethyl acetate to the obtained dispersion.

Then, the resulting coating liquid A for the charge generating layer was dip-coated on the undercoat layer to form a coating film, and the coating film was heated and dried at 100° C. for 10 minutes to form a charge generating layer with a thickness of 0.2 μm.

<Charge Transporting Layer>

A charge transporting compound (N, N, N', N'-Tetrakis (p-tolyl) benzidine purified by sublimation (manufactured by Tokyo Chemical Industry Co., Ltd.) represented by the following formula (C-1) 72 parts, a charge transporting compound represented by the following formula (C-4) 48 parts, a polycarbonate (trade name: Iupilon (trademark) Z400, manufactured by Mitsubishi Engineering-Plastics Corporation) as a binder resin 100 parts, the compound represented by the formula (C-2) 0.0242 parts, and the compound represented by the formula (C-3) 0.033 parts were prepared.

(C-1)

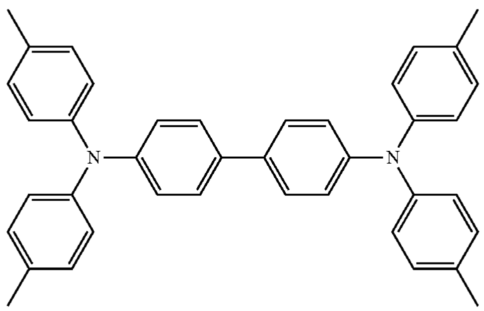

(C-4)

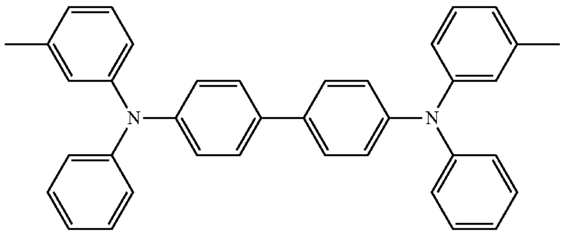

The above materials were dissolved in a mixed solvent of 250 parts of orthoxylene/250 parts of methyl benzoate/250 parts of dimethoxymethane to prepare a coating liquid for the charge transporting layer.

Then, the obtained coating liquid for the charge transporting layer was dip-coated onto the charge generating layer to form a coating film, which was then dried at 120° C. for 30 minutes to form a charge transporting layer with a thickness of 16 μm.

<Analysis of Amount of Compound>

The mass of each of charge transporting substances, the binder resin, and the compounds relative to the total mass of the charge transporting layer was analyzed under the following conditions.

The surface of the obtained electrophotographic photosensitive member was scraped off with a razor to obtain a charge transporting layer section. The charge transporting layer section was dissolved in deuterated chloroform, and then subjected to 1H-NMR measurement (equipment: AVANCEIII 500, manufactured by BRUKER) to determine the mass of each of the charge transporting compounds (C-1), (C-4), and the binder resin relative to the total mass of the charge transporting layer.

In addition, the charge transporting layer section was dissolved in chloroform and dropped into methanol to precipitate binder resin. The obtained methanol solution was filtered using a 0.45 μm diameter filter, and the obtained filtrate was subjected to liquid chromatography mass spectrometry (LC/MS) to determine the mass of the compound represented by the formula (C-2) (also called compound (C-2)) and the compound represented by the formula (C-3) (also called compound (C-3)) relative to the charge transporting compound (C-1).

Based on the above analysis, the following A-Z values were calculated. The results obtained are shown in Table 1.

A (ppm): mass of the compound (C-2) relative to the total mass of the charge transporting layer B (ppm): mass of the compound (C-3) relative to the total mass of the charge transporting layer
C (%): mass of the charge transporting compound (C-1) to the total mass of the charge transporting substance
D (ppm): mass of the compound (C-2) relative to mass of the charge transporting compound (C-1)
E (ppm): mass of the compound (C-3) relative to mass of the charge transporting compound (C-1)
X (ppm): sum of A and B (X=A+B)
Y (%): mass of the charge transporting compound (C-1) relative to the total mass of the binder resin
Z (ppm): sum of D and E (Z=D+E)

Examples 2 to 8

The electrophotographic photosensitive members were prepared and analyzed in the same manner as in Example 1, except that the type and the content of the charge transporting compound, the content of the binder resin, and the contents of the compounds represented by the formulas (C-2) and (C-3) were changed to obtain the values in Table 1.

Example 9

The electrophotographic photosensitive member was prepared and analyzed in the same manner as in Example 2, except that a charge transporting compound represented by the following formula (C-5) was used instead of the charge transporting compound represented by the formula (C-4).

(C-5)

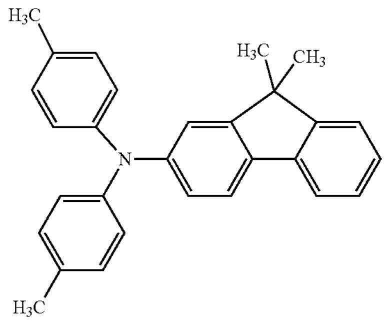

Example 10

The electrophotographic photosensitive member was prepared and analyzed in the same manner as in Example 3, except that a charge transporting compound represented by the formula (C-5) was used instead of the charge transporting compound represented by the formula (C-4).

Example 11

The electrophotographic photosensitive member was prepared and analyzed in the same manner as in Example 4, except that a charge transporting compound represented by the formula (C-5) was used instead of the charge transporting compound represented by the formula (C-4).

Examples 12 to 26

The electrophotographic photosensitive members were prepared and analyzed in the same manner as in Example 1, except that the type and the content of the charge transporting compound, the content of the binder resin, and the contents of the compounds represented by the formulas (C-2) and (C-3) were changed to obtain the values in Table 1.

Example 27

The electrophotographic photosensitive member was prepared and analyzed in the same manner as in Example 2, except that the following coating liquid B for the charge generating layer was used as the coating liquid for the charge generating layer.

[Preparation of Coating Liquid B for the Charge Generating Layer]

Hydroxygallium phthalocyanine pigment with the crystal type showing peaks at Bragg angles 2θ of 7.5° and 28.4° in the chart of an X-ray diffraction spectrum using CuKα radiation 10 parts, polyvinyl butyral (trade name: S-LEC (trademark) BX-1, manufactured by Sekisui Chemical Co., LTD.) 5 parts were prepared. The above materials were added into 200 parts of cyclohexanone and subjected to dispersion treatment using 0.9 mm diameter glass in a sand mill apparatus for 6 hours, diluted by 150 parts of cyclohexanone and 350 parts of ethyl acetate to obtain coating liquid B for the charge generating layer.

Example 28

The electrophotographic photosensitive member was prepared and analyzed in the same manner as in Example 3, except that the above coating liquid B for the charge generating layer was used as the coating liquid for the charge generating layer.

Example 29

The electrophotographic photosensitive member was prepared and analyzed in the same manner as in Example 4, except that the above coating liquid B for the charge generating layer was used as the coating liquid for the charge generating layer.

Comparative Examples 1 and 2

The electrophotographic photosensitive members were prepared and analyzed in the same manner as in Example 1, except that the A (ppm) which is the content of the compound represented by the formula (C-2) with respect to the total mass of the charge transporting layer and the B (ppm) which is the content of the compound represented by the formula (C-3) with respect to the total mass of the charge transporting layer were changed to obtain the values in Table 1.

Comparative Example 3

The electrophotographic photosensitive members were prepared and analyzed in the same manner as in Example 2, except that the coating liquid for the charge transporting layer was prepared by the following conditions.

A compound represented by the formula (C-5) 72 parts, a compound represented by the following formula (C-6) 8 parts, a polycarbonate (Trade name: Iupilon (trademark) Z400, manufactured by Mitsubishi Engineering-Plastics Corporation) 100 parts, the compound represented by the formula (C-2) 0.033 parts, and the compound represented by the formula (C-3) 0.044 parts were prepared.

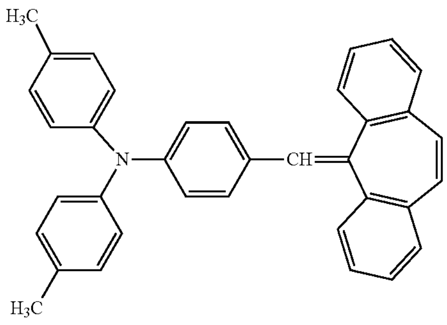

(C-6)

The above materials were dissolved in a mixed solvent of 250 parts of orthoxylene/250 parts of methyl benzoate/250 parts of dimethoxymethane to prepare a coating liquid for the charge transporting layer.

[Evaluation]

Using the photosensitive members prepared Examples 1 to 29 and the photosensitive members prepared in Comparative Examples 1 to 3, potential fluctuations were evaluated under the following conditions.

A modified version of HP LaserJet (trade mark) Enterprise Color M553dn laser beam printer manufactured by Hewlett-Packard corporation was used for the electrophotographic apparatus. Specifically, the modified version was modified to change the printing process speed to 80 (pages/minute), enable adjustment and measurement of the applying voltage to the charging roller, and enable adjustment and measurement of the intensity of image exposure light.

First, the image forming apparatus and the photosensitive member were left in an environment with a temperature of 15° C. and a humidity of 10% RH for more than 24 hours, and then the photosensitive members of Examples and Comparative Examples were mounted on the cyan cartridge of the image forming apparatus.

As an evaluation of the repeated use, 20,000 test chart images with a printing ratio of 5% were continuously output on A4 size plain paper. As the charging condition, the dark potential was adjusted to −600 V, and as the exposure condition, the amount of image exposure light was adjusted to 0.4 $pJ/cm^2$.

The amount of fluctuation in light potential before and after the above repeated use was evaluated. The surface potential of the photosensitive member was measured by modifying the cartridge and attaching a potential probe (trade name: model 6000B-8, manufactured by Trek Japan Corporation) to the developing position. The potential was measured using a surface electrometer (trade name: model 344, manufactured by Trek Japan Corporation). The potential fluctuation A (V) was obtained by subtracting the absolute value of the light potential before repeated use from the absolute value of the light potential after repeated use according to the following formula.

$$\text{Potential fluctuation}\Delta=|\text{Light potential after repeated use}|-|\text{Light potential before repeated use}|$$

The results of the evaluation are shown in Tables 1-1 to 1-4.

TABLE 1-1

| | Type of coating liquid for charge generating layer | Charge transporting compound 1 | | Charge transporting compound 2 | |
|---|---|---|---|---|---|
| | | Type | Mass of charge transporting compound (C-1) or (C-5) relarive to total mass of binder resin (%) | Type | Mass of charge transporting compound (C-4), (C-5) or (C-6) relarive to total mass of binder resin (%) |
| Example 1 | A | (C-1) | 72 | (C-4) | 48 |
| Example 2 | A | (C-1) | 72 | (C-4) | 48 |
| Example 3 | A | (C-1) | 72 | (C-4) | 48 |
| Example 4 | A | (C-1) | 72 | (C-4) | 48 |
| Example 5 | A | (C-1) | 72 | (C-4) | 48 |
| Example 6 | A | (C-1) | 72 | (C-4) | 48 |
| Example 7 | A | (C-1) | 72 | (C-4) | 48 |
| Example 8 | A | (C-1) | 72 | (C-4) | 48 |
| Example 9 | A | (C-1) | 72 | (C-5) | 48 |
| Example 10 | A | (C-1) | 72 | (C-5) | 48 |
| Example 11 | A | (C-1) | 72 | (C-5) | 48 |
| Example 12 | A | (C-1) | 42 | (C-4) | 28 |
| Example 13 | A | (C-1) | 60 | (C-4) | 40 |
| Example 14 | A | (C-1) | 96 | (C-4) | 64 |
| Example 15 | A | (C-1) | 114 | (C-4) | 76 |
| Example 16 | A | (C-1) | 36 | (C-4) | 84 |
| Example 17 | A | (C-1) | 54 | (C-4) | 66 |

TABLE 1-2

| | Mass of compound (C-2) relative to total mass of charge transporting layer (ppm) | Mass of compound (C-3) relative to total mass of charge transporting layer (ppm) | X (ppm) | C (%) | Z (ppm) | Potential fluctuation (V) |
|---|---|---|---|---|---|---|
| Example 1 | 110 | 150 | 260 | 60 | 953 | 19 |
| Example 2 | 130 | 170 | 300 | 60 | 1100 | 17 |
| Example 3 | 150 | 200 | 350 | 60 | 1283 | 15 |
| Example 4 | 170 | 230 | 400 | 60 | 1467 | 15 |
| Example 5 | 190 | 260 | 450 | 60 | 1650 | 17 |
| Example 6 | 210 | 290 | 500 | 60 | 1833 | 19 |
| Example 7 | 230 | 320 | 550 | 60 | 2017 | 20 |
| Example 8 | 260 | 350 | 610 | 60 | 2237 | 22 |
| Example 9 | 130 | 170 | 300 | 60 | 1100 | 18 |
| Example 10 | 150 | 200 | 350 | 60 | 1283 | 16 |
| Example 11 | 170 | 230 | 400 | 60 | 1467 | 15 |
| Example 12 | 150 | 200 | 350 | 60 | 992 | 17 |
| Example 13 | 150 | 200 | 350 | 60 | 1167 | 15 |
| Example 14 | 150 | 200 | 350 | 60 | 1517 | 17 |
| Example 15 | 150 | 200 | 350 | 60 | 1692 | 20 |
| Example 16 | 150 | 200 | 350 | 30 | 2567 | 18 |
| Example 17 | 150 | 200 | 350 | 45 | 1711 | 15 |

TABLE 1-3

| | | Charge transporting compound 1 | | Charge transporting compound 2 | |
|---|---|---|---|---|---|
| | Type of coating liquid for charge generating layer | Type | Mass of charge transporting compound (C-1) or (C-5) relarive to total mass of binder resin (%) | Type | Mass of charge transporting compound (C-4), (C-5) or (C-6) relarive to total mass of binder resin (%) |
| Example 18 | A | (C-1) | 90 | (C-4) | 30 |
| Example 19 | A | (C-1) | 108 | (C-4) | 12 |
| Example 20 | A | (C-1) | 45 | (C-4) | 5 |
| Example 21 | A | (C-1) | 90 | (C-4) | 10 |
| Example 22 | A | (C-1) | 72 | (C-4) | 48 |
| Example 23 | A | (C-1) | 72 | (C-4) | 48 |
| Example 24 | A | (C-1) | 72 | (C-4) | 48 |
| Example 25 | A | (C-1) | 72 | (C-4) | 48 |
| Example 26 | A | (C-1) | 72 | (C-4) | 48 |
| Example 27 | B | (C-1) | 72 | (C-4) | 48 |
| Example 28 | B | (C-1) | 72 | (C-4) | 48 |
| Example 29 | B | (C-1) | 72 | (C-4) | 48 |
| Comparative Example 1 | A | (C-1) | 72 | (C-4) | 48 |
| Comparative Example 2 | A | (C-1) | 72 | (C-4) | 48 |
| Comparative Example 3 | A | (C-5) | 72 | (C-6) | 48 |

TABLE 1-4

| | Mass of compound (C-2) relative to total mass of charge transporting layer (ppm) | Mass of compound (C-3) relative to total mass of charge transporting layer (ppm) | X (ppm) | C (%) | Z (ppm) | Potential fluctuation (V) |
|---|---|---|---|---|---|---|
| Example 18 | 150 | 200 | 350 | 75 | 1027 | 17 |
| Example 19 | 150 | 200 | 350 | 90 | 856 | 20 |
| Example 20 | 110 | 150 | 260 | 90 | 433 | 21 |
| Example 21 | 110 | 150 | 260 | 90 | 578 | 21 |
| Example 22 | 0 | 350 | 350 | 60 | 1283 | 10 |
| Example 23 | 50 | 300 | 350 | 60 | 1283 | 12 |
| Example 24 | 100 | 250 | 350 | 60 | 1283 | 14 |
| Example 25 | 200 | 150 | 350 | 60 | 1283 | 16 |
| Example 26 | 250 | 100 | 350 | 60 | 1283 | 19 |
| Example 27 | 130 | 170 | 300 | 60 | 1100 | 20 |
| Example 28 | 150 | 200 | 350 | 60 | 1283 | 18 |

TABLE 1-4-continued

| | Mass of compound (C-2) relative to total mass of charge transporting layer (ppm) | Mass of compound (C-3) relative to total mass of charge transporting layer (ppm) | X (ppm) | C (%) | Z (ppm) | Potential fluctuation (V) |
|---|---|---|---|---|---|---|
| Example 29 | 170 | 230 | 400 | 60 | 1467 | 18 |
| Comparative Example 1 | 40 | 60 | 100 | 60 | 367 | 45 |
| Comparative Example 2 | 350 | 460 | 810 | 60 | 2970 | 65 |
| Comparative Example 3 | 150 | 200 | 350 | 60 | 1283 | 55 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-150269, filed Sep. 21, 2022, which is hereby incorporated by reference herein in its entirety.

What is claimed is:

1. An electrophotographic photosensitive member comprising:

a support, a charge generating layer, and a charge transporting layer in this order, wherein the charge transporting layer comprises:

(α) a compound represented by a following formula (C-1), and (β) at least one selected from the group consisting of a compound represented by a following formula (C-2) and a compound represented by a following formula (C-3), wherein a content of the (β) in the charge transporting layer with respect to a total mass of the charge transporting layer is 250 to 610 mass ppm (C-1)

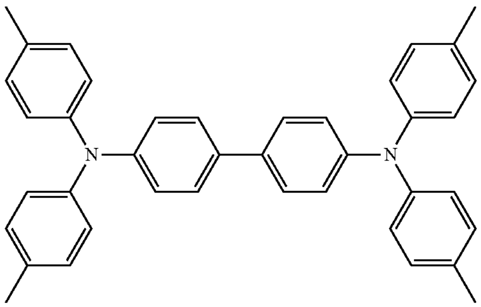

(C-2)

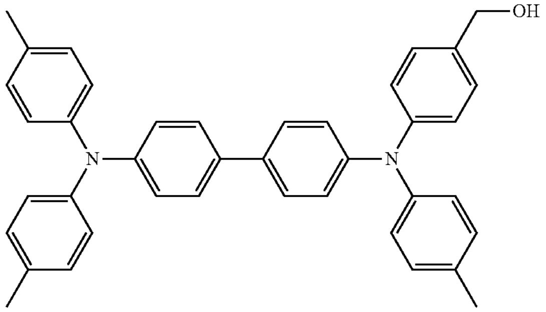

-continued (C-3)

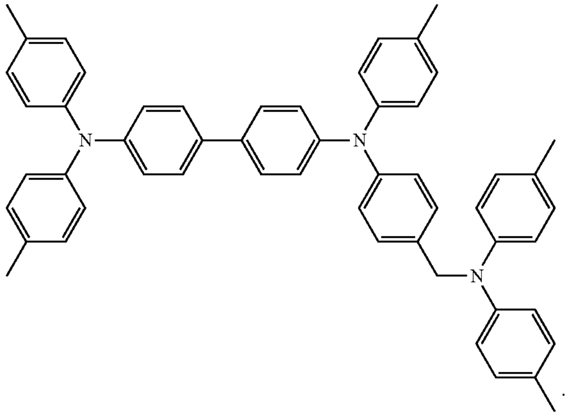

2. The electrophotographic photosensitive member according to claim 1, wherein the content of the (β) in the charge transporting layer with respect to the total mass of the charge transporting layer is 350 to 500 mass ppm.

3. The electrophotographic photosensitive member according to claim 1, wherein the charge transporting layer comprises a binder resin, wherein a content of the compound represented by the formula (C-1) in the charge transporting layer with respect to a content of the binder resin is 20 to 200 mass %.

4. The electrophotographic photosensitive member according to claim 3, wherein the content of the compound represented by the formula (C-1) in the charge transporting layer with respect to the content of the binder resin is 40 to 100 mass %.

5. The electrophotographic photosensitive member according to claim 1, wherein the charge transporting layer comprises the compound represented by the formula (C-3).

6. The electrophotographic photosensitive member according to claim 1, wherein a content of the compound represented by the formula (C-1) in the charge transporting layer with respect to a total content of the (α) and the (β) is 30 mass % or more.

7. The electrophotographic photosensitive member according to claim 1, wherein the charge generating layer comprises an oxy titamium phthalocyanine crystal as a charge generating substance, wherein the oxy titamium phthalocyanine crystal is a crystal type oxy titamium phthalocyanine crystal having peaks at Bragg angles 2θ of 9.8°±0.3° and 27.1°±0.3° in an X-ray diffraction spectrum using CuKα radiation.

8. A process cartridge comprising:

an electrophotographic photosensitive member;

and at least one unit selected from the group consisting of a charging unit, a developing unit, and a cleaning unit, the process cartridge integrally supporting the electrophotographic photosensitive member and the at least one unit, and being detachably attachable to a main body of an electrophotographic apparatus, wherein the electrophotographic photosensitive member comprises:

a support, a charge generating layer, and a charge transporting layer in this order, wherein the charge transporting layer comprises:

(α) a compound represented by a following formula (C-1), and (β) at least one selected from the group consisting of a compound represented by a following formula (C-2) and a compound represented by a following formula (C-3), wherein a content of the (β) in the charge transporting layer with respect to a total mass of the charge transporting layer is 250 to 610 mass ppm (C-1)

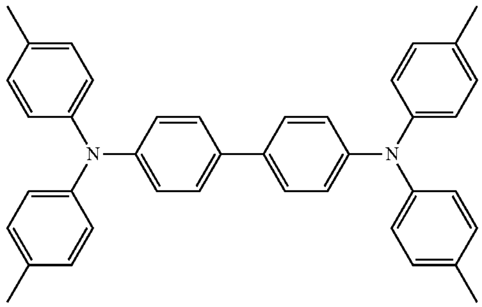

(C-2)

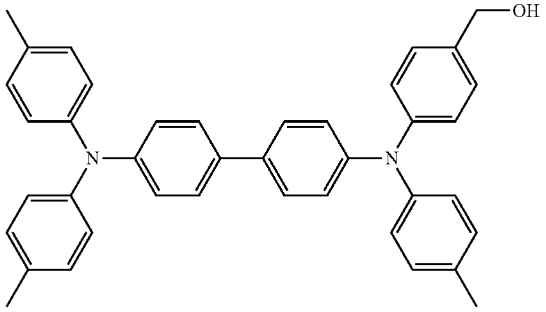

-continued (C-3)

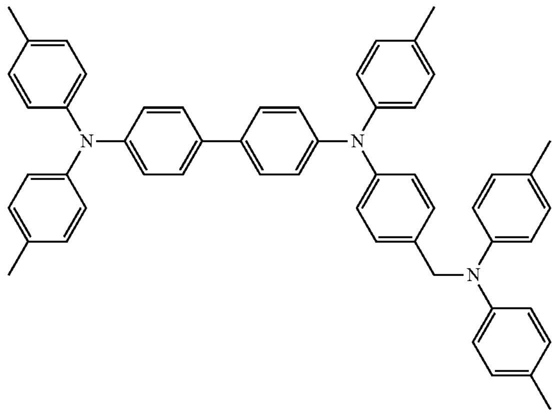

.

9. An electrophotographic apparatus comprising:

an electrophotographic photosensitive member, an exposing unit, a charging unit, a developing unit, and a transfer unit, wherein the electrophotographic photosensitive member comprises:

a support, a charge generating layer, and a charge transporting layer in this order, wherein the charge transporting layer comprises:

(α) a compound represented by a following formula (C-1), and (β) at least one selected from the group consisting of a compound represented by a following formula (C-2) and a compound represented by a following formula (C-3), wherein a content of the (β) in the charge transporting layer with respect to a total mass of the charge transporting layer is 250 to 610 mass ppm (C-1)

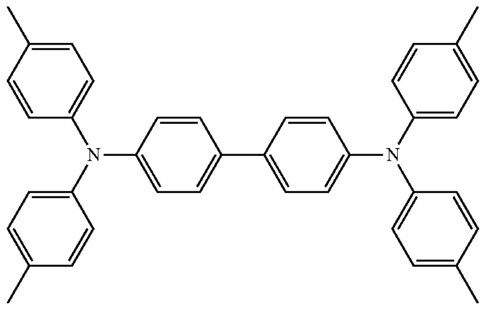

-continued
(C-2)
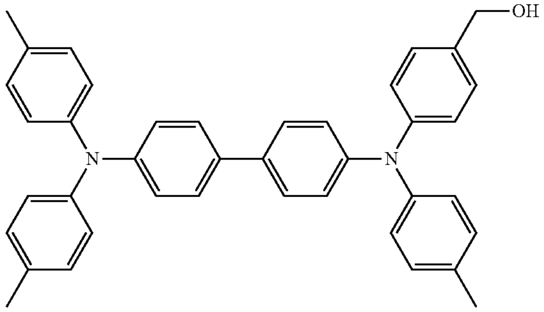
-continued
(C-3)
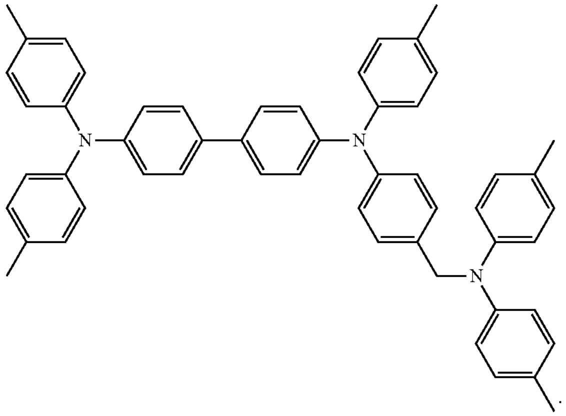
* * * * *